United States Patent [19]

Germain

[11] 4,075,760
[45] Feb. 28, 1978

[54] BATTERY OPERATED SHEARS

[75] Inventor: Robert A. Germain, Ashtabula, Ohio

[73] Assignee: True Temper Corporation, Cleveland, Ohio

[21] Appl. No.: 433,669

[22] Filed: Jan. 16, 1974

Related U.S. Application Data

[63] Continuation of Ser. No. 270,608, Jul. 11, 1972, abandoned.

[51] Int. Cl.² ............................................. B26B 19/02
[52] U.S. Cl. ........................................ 30/220; 30/222
[58] Field of Search .................. 30/210, 213, 216, 220, 30/221, 222, 223, 267

[56] References Cited

U.S. PATENT DOCUMENTS

| 1,584,459 | 5/1926 | Link | 30/213 X |
| 2,540,616 | 2/1951 | Hasslacher | 30/223 X |
| 3,193,925 | 7/1965 | Hawley | 30/223 X |
| 3,474,534 | 10/1969 | Murphy | 30/267 X |
| 3,623,223 | 11/1971 | Edgell | 30/220 |

Primary Examiner—Jimmy C. Peters

[57] ABSTRACT

There is disclosed herein a battery operated power grass shear wherein a fixed blade and a superimposed laterally oscillating movable blade have forwardly projecting, laterally spaced cutting teeth, the planes of said blades being tilted convergently relative to each other in the forward direction, the teeth of the upper and lower blades contacting each other only at the cutting edges thereof during cutting movements, and each tooth of the movable blade beginning its cutting stroke at a different time in each cutting cycle.

7 Claims, 14 Drawing Figures

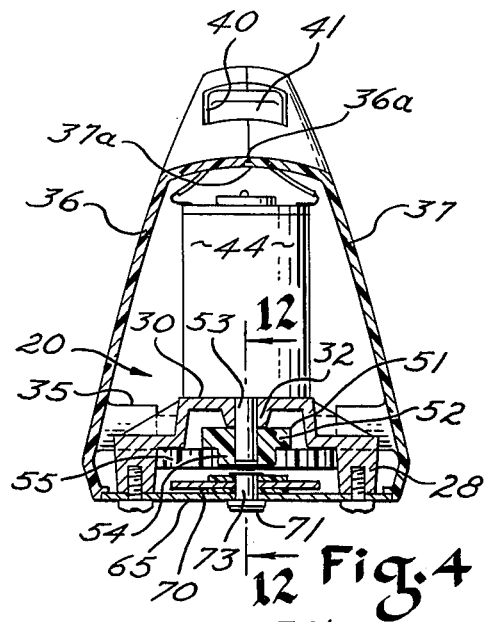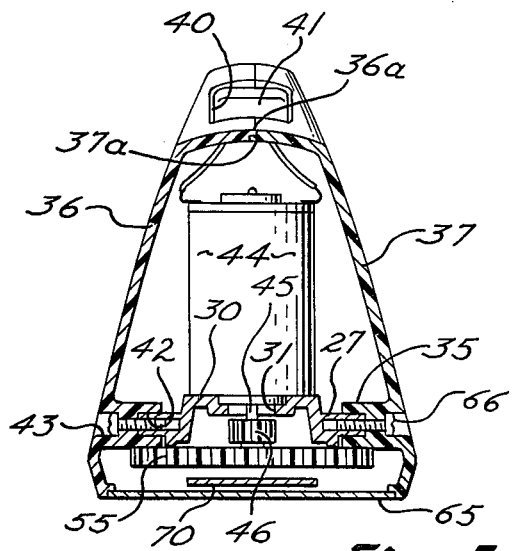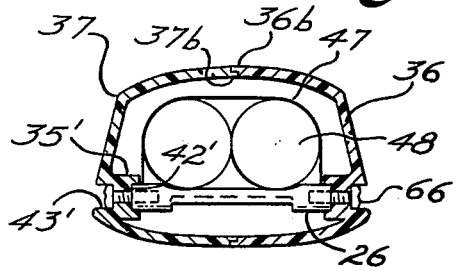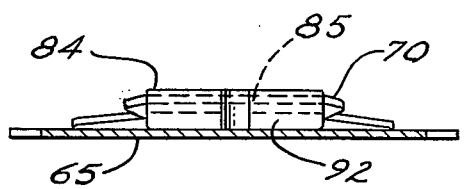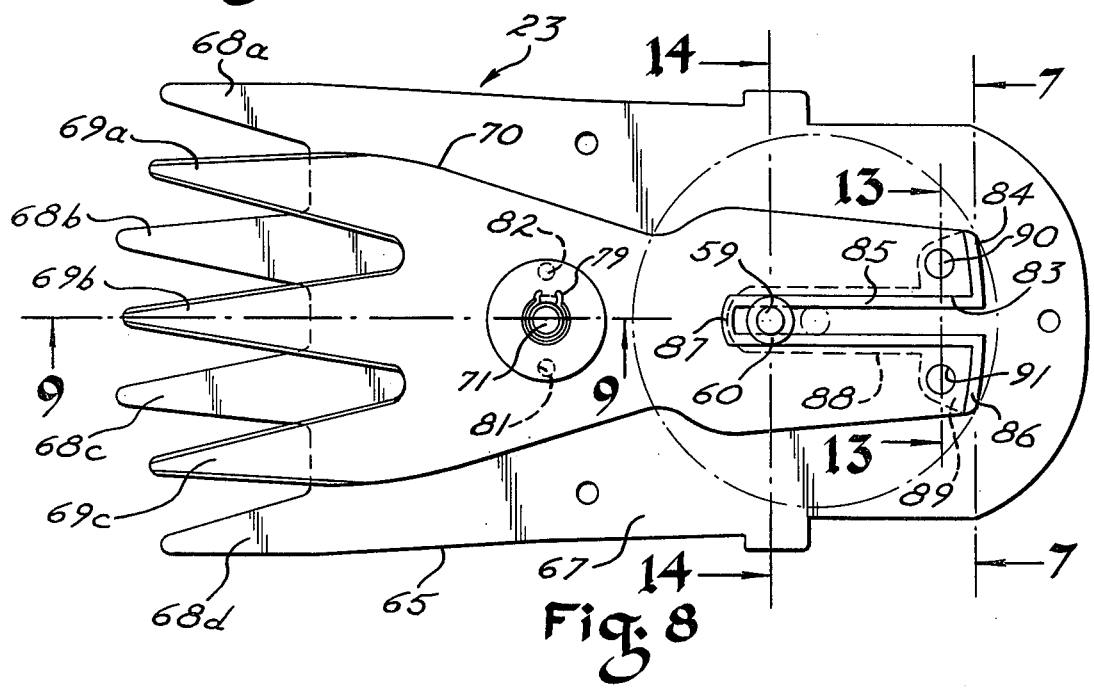

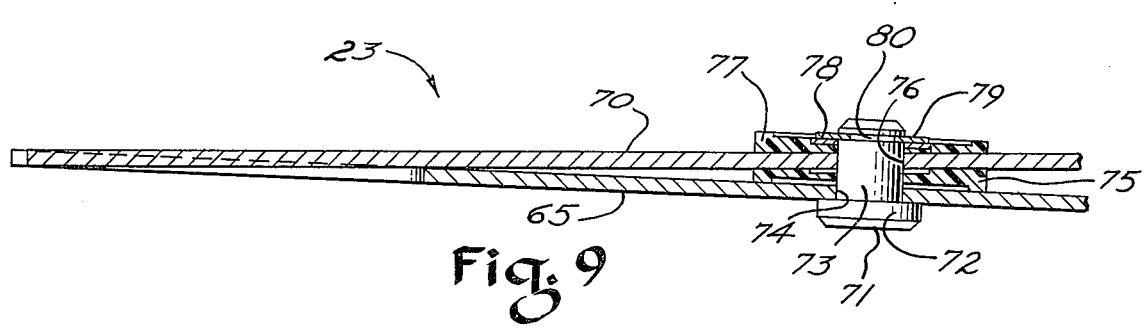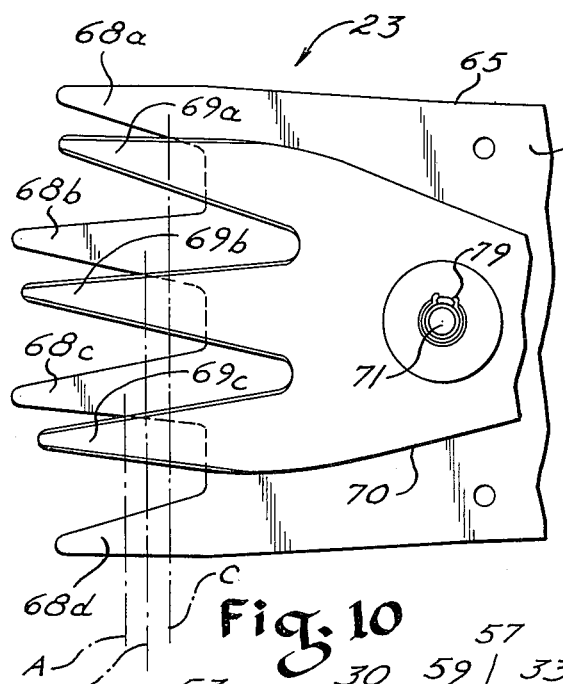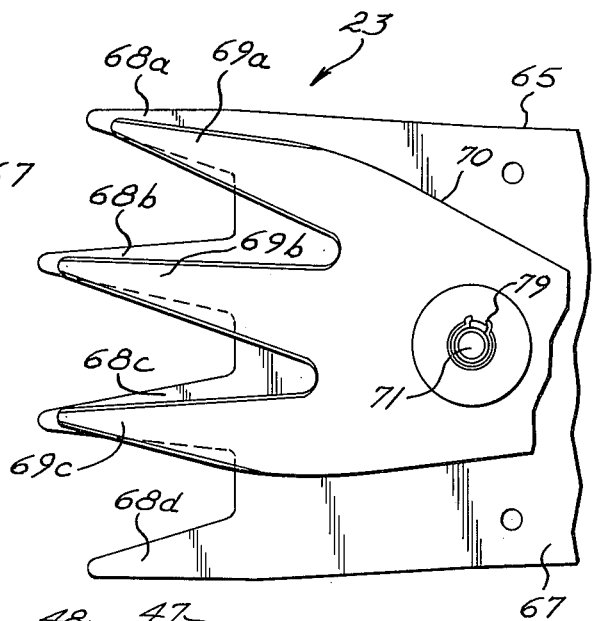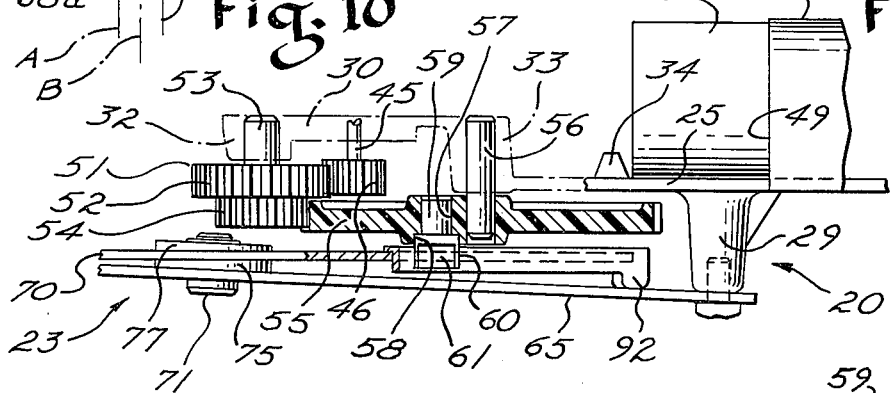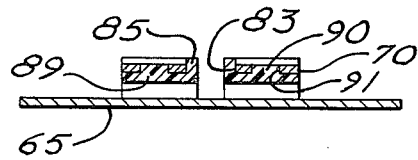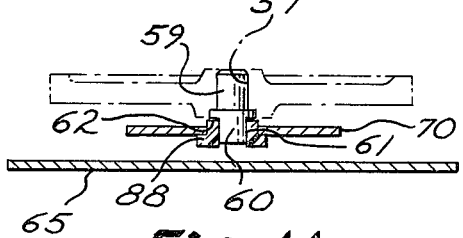

BATTERY OPERATED SHEARS

This is a continuation of application Ser. No. 270,608 filed July 11, 1972, now abandoned.

This invention relates to shearing devices and particularly to hand manipulated grass shears wherein forwardly projecting teeth of a movable blade rapidly oscillate laterally in shearing movements.

Battery operated grass and hedge shears are well known, their practicality being increased by the use of rechargable batteries and simple means for recharging the batteries from ordinary household current. Problems encountered in the manufacture of such shears comprise providing sufficient power and cutting efficiency while at the same time keeping the shear light and not excessively tiring to use. Known solutions to these problems include the use of a lighter, low power motor and also the provision of thin gage, highly flexible blades which are not efficient for cutting tough grass and flex outwardly to pass over tougher grasses and weeds.

In the present invention, the shear blades are of the same thickness and are made of a heavy gage metal of substantial stiffness and only limited flexibility. This ensures a firm, positive cutting action at all times. Additionally, the planes of the blades are tilted convergently forwardly relative to each other whereby the teeth, which are forwardly tapered and laterally spaced, contact only at the cutting edges thereof thus greatly reducing normal friction between the blades which are usually in substantially flatwise contact during shearing movements. Thus the maximum shearing power is obtained from even a small, fractional horsepower electric motor. Additionally, the teeth of the blades are so relatively spaced that each tooth begins to cut at a different time in any shearing movement thereby reducing the sudden load upon the motor and transmission means encountered at each reversal of the oscillatory movement.

In view of the foregoing, the general object of this invention is to provide an improved, battery operated shearing device which is particularly adaptable as a grass shear.

Another object of this invention is to provide a shearing device as set forth above which has a firm, positive cutting action at all times.

Still another object of this invention is to provide a shearing device of the above type wherein only the cutting edge portion of the teeth are in contact during a shearing motion.

Yet another object of the invention is to provide a shearing device having a plurality of relatively oscillating teeth wherein each tooth begins to cut at a different time in the shearing movement whereby to reduce the sudden load shock upon the motor and transmission means at each reversal of the oscillatory movement.

A still further object of the invention is to provide a battery operated, hand manipulated grass shear wherein frictional resistance is reduced to a minimum whereby power from the motor is utilized with maximum efficiency.

Other objects of the invention and the invention itself will be readily apparent from the following description of one embodiment thereof as disclosed in the accompanying drawings, in which said drawings:

FIG. 4 is a vertical section taken along the line 4—4 of FIG. 2;

FIG. 5 is a vertical section taken along the line 5—5 of FIG. 2;

FIG. 6 is a vertical section taken along the line 6—6 of FIG. 2;

FIG. 7 is a rear edge view of the movable shear blade as seen from the line 7—7 of FIG. 8;

FIG. 8 is an enlarged top plan view of the cutting blade assembly of the shear;

FIG. 9 is a still further enlarged, sectional detail taken along the line 9—9 of FIG. 8;

FIG. 10 is a fragmentary top plan view of the forward part of the blade assembly of FIG. 8 showing the blade teeth in an intermediate position during a shearing movement;

FIG. 11 is a view similar to FIG. 10 showing the blade teeth in an extreme lateral overlapping position;

FIG. 12 is a fragmentary view, part in section and part in broken lines, of the shear as shown in FIG. 3, enlarged thereover;

FIG. 13 is a section taken along the line 13—13 of FIG. 8; and

FIG. 14 is a section taken along the line 14—14 of FIG. 8.

Figure 1:
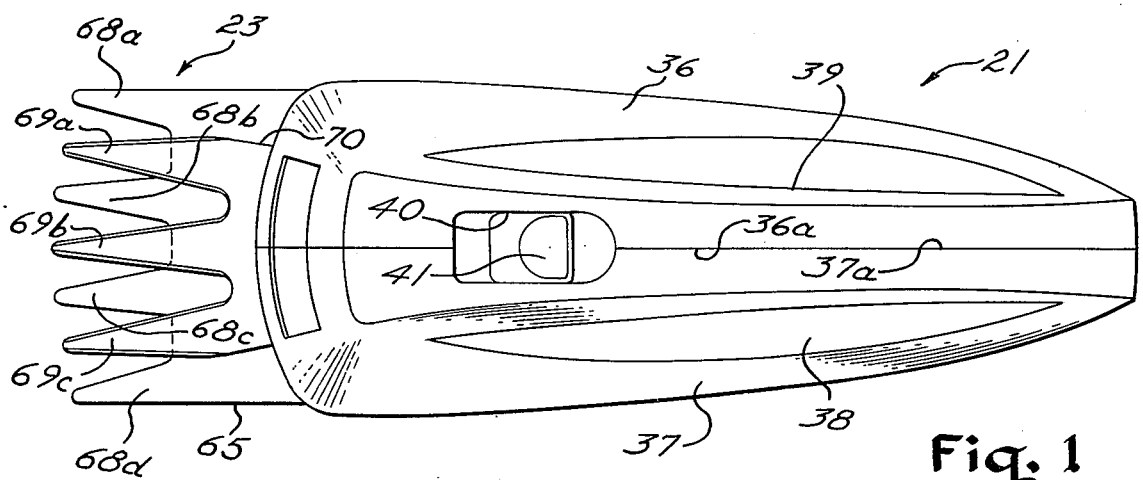
FIG. 1 is a top plan view of a grass shear embodying the present invention.

Referring now to the drawings in all of which like parts are designated by like reference numerals, the shear of this invention as herein disclosed comprises a central mounting member generally indicated at 20 which provides a common mount and means of connection for all of the parts of the shear. The major components of the shear which are all connected to the mounting member 20 comprise a housing 21, power means 22, and a cutting blade assembly 23.

Figure 3:
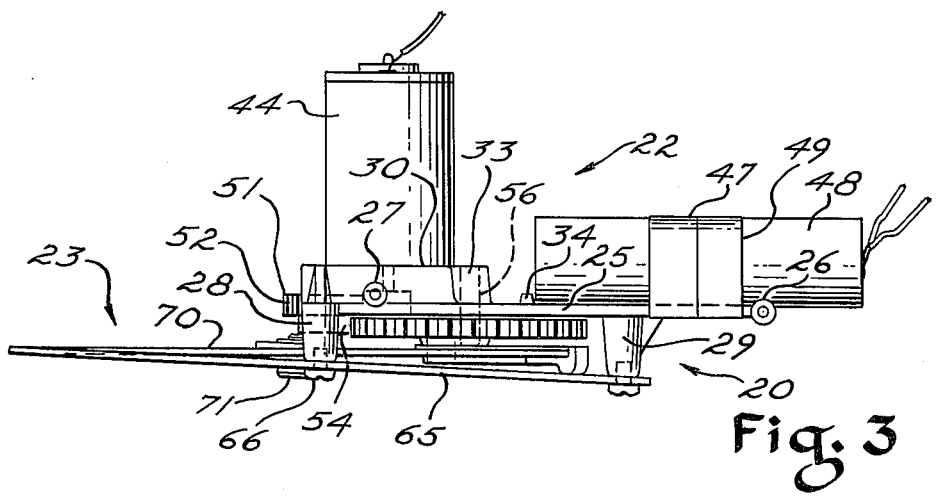
FIG. 3 is a side elevation of the shear with the housing removed.

The mounting member 20 comprises a flat base 25 having integrally formed, laterally projecting bolt sockets 26 adjacent to the rear edges thereof and integrally formed, laterally projecting bolt sockets 27 adjacent to but spaced slightly rearwardly of the front edge of said base. The base 25 also has a pair of downwardly projecting, integral legs 28 adjacent to the forward corner edges thereof and a single, somewhat longer leg 29 projecting downwardly from the center of said base forwardly of the bolt sockets 26 and substantially rearwardly of the front legs 28. As shown in FIGS. 4 and 5, the forward portion of the base 25 is provided with an elevated support portion 30 having a downwardly recessed opening 31 and an integral, downwardly projecting pin mounting boss 32. The support portion 30 also includes a second pin mounting boss 33 which is best seen in full line in FIG. 3 and in broken lines in FIG. 12. The first pin mounting boss 32 is disposed adjacent to the forward edge of the base 25, the opening 31 being disposed and spaced directly rearwardly therefrom, and the second mentioned pin mounting boss 33 is disposed and spaced rearwardly of said opening 31. The base 25 is also preferably provided with a laterally directed, upwardly projecting positioning rib 34 which is disposed and spaced rearwardly of the pin mounting boss 33.

Figure 2:
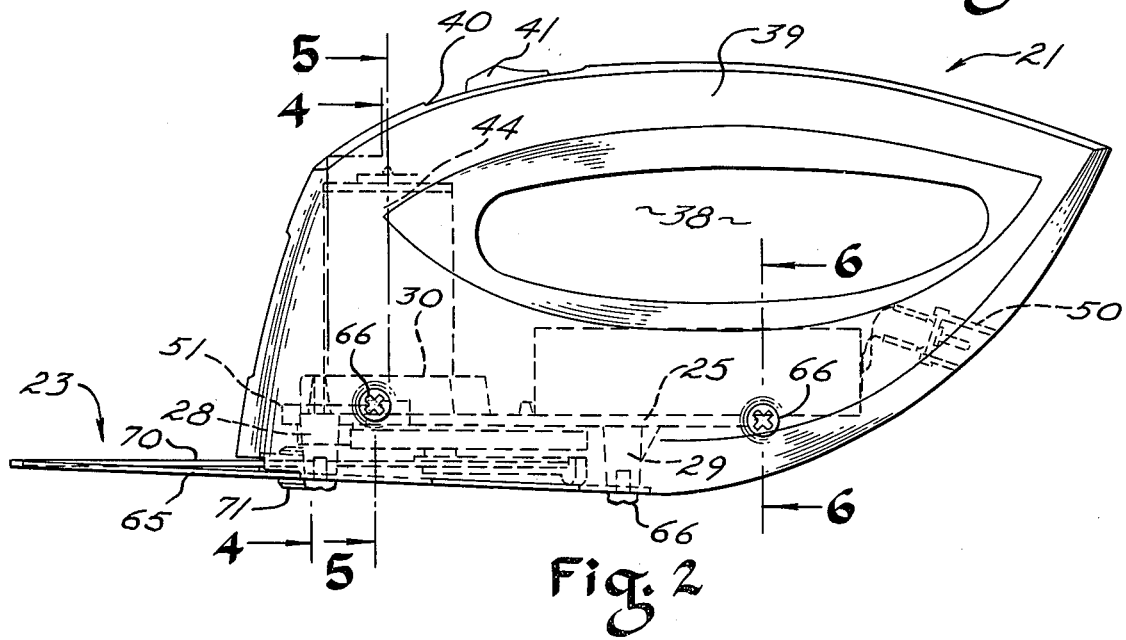
FIG. 2 is a side elevation of the grass shear of FIG. 1.

Referring now particularly to FIGS. 5 and 6, the housing 31 as herein illustrated comprises a pair of complementary half shells, a right-hand half shell 36 and a left-hand half shell 37. The shells 36 and 37 may be molded from a suitable rigid plastic and are adapted, upon assembly, to provide a hollow housing which is attractive to the eye and suitable for encasing the other shear components. The half shells 36 and 37 have stepped, outer matching edge portions 36a and 37a which meet along a central seam line and define the outer contour of the housing as seen in side elevation (FIG. 2). Said half shells 36 and 37 also have inner, stepped mating edge portions 36b and 37b (FIG. 6) which define the contour of a handgrip opening 38 which is disposed above the middle of the housing whereby the upper portion of said housing defines, in effect, a handle 39 for grasping the shears.

As best seen in FIG. 1, the mating outer edge portions 36a and 37a are modified at the top, forward portion of the handle 39 to provide a cut-out 40 in which a conventional thumb switch 41 is mounted. It will be understood that the switch 41 may be of any suitable type, preferably incorporating a safety-off lock feature, for energizing and actuating the power means 22 and that the same forms no part of the present invention.

The housing half shells 36 and 37 are secured to the mounting member 20 by means of laterally inwardly formed bosses 35 and 35' which are directly aligned with the oppositely directed bolt sockets 27 and 26, respectively. Said bosses 35 and 35' are provided with recesses 42 and 42', respectively, into which the respective bolt sockets are seated. Small screws of the type shown at 66 extend inwardly through the side of the half shells through suitable openings therein and engage the respective bolt sockets whereby said half shells are tightly secured to the mounting member. The heads of the bolts 66 are preferably disposed within outer recesses 43 and 43' which are coaxial with the inner recesses 42 and 42', respectively.

The power means 22 comprises a suitable, direct current electric motor 44 mounted on a vertical axis on top of the support portion 30 whereby the motor drive shaft 45 projects downwardly through and below the opening 31. As best seen in FIG. 5, the lower end of the drive shaft 45 carries thereon a main drive gear 46. Electrical energy for the electric motor 44 is provided by means of a battery pack 47 comprising a pair of rechargeable batteries 48 secured to the top of the base 25 in any suitable manner such as by means of straps 49. It will be noted that the forwardly directed ends of the rechargeable batteries 48 are disposed adjacent to the rib 34 whereby said batteries are properly positioned and cannot shift forwardly in use. As shown in broken lines in FIG. 2, the battery pack 47 is connected to a suitable socket 50 shown in dotted lines and mounted in the housing 21 at the lower side thereof rearwardly of said battery pack. It will be understood that the socket 50 provides means for connecting a battery charger of any conventional, well-known type (not herein shown) by means of which the batteries 48 can be recharged from ordinary household alternating current. It will also be understood that the battery pack 47 is connected electrically in a known manner to the motor 44 through the thumb switch 41.

Further elements of the power means include transmission means comprising a gear train beginning with the main drive gear 46. The main drive gear 46 engages a reducer gear 51 at the upper, larger gear portion 52 thereof. The reducer gear 51 is carried forwardly of the main drive gear 46 on a pin 53 projecting downwardly from and secured in the forward pin mounting boss 32. A lower, smaller gear portion 54 of said reducer gear engages a substantially larger driven gear 55 which is rotatably mounted upon a downwardly projecting pin 56 secured at its upper end in the rear, second pin mounting boss 33 as best seen in FIG. 12.

The large driven gear 55 has an eccentrically disposed socket 57 which is countersunk at the bottom as indicated at 58. The socket 57 is adapted to receive a drive pin 59 having a lower enlarged portion 60 the upper part of which seats within the recess 58. The lower part of the enlarged portion 60 is provided with diametrically opposite flats 61 above which are overhanging shoulders 62, best seen in FIG. 14. The drive pin 59 is adapted to directly actuate the cutting blade assembly 23 in the manner now to be described.

The cutting blade assembly 23 comprises a fixed blade 65 secured tightly against the bottoms of the legs 28 and 29 of the mounting member 20 by means of upwardly directed screws 66. It will be noted, for example in FIG. 3, that due to the fact that the rear leg 29 is longer than the front leg 28 the fixed blade 65 is angularly disposed with respect to the plane of the base 25 of the mounting member 20. Fixed blade 65 is shown in detail in FIG. 8, the same being made of a substantially heavy sheet metal of limited flexibility having a main body portion 67 so formed as to effectively close the bottom of the housing 21. As herein shown, said fixed blade has four laterally spaced, forwardly directed and forwardly tapering teeth 68a, 68b, 68c, and 68d. The middle teeth 68b and 68c project forwardly further than the end teeth 68a and 68d, all of said teeth being disposed on a substantially large arc. As shown in FIG. 1, the teeth 68a-d are disposed outwardly, well in front of the housing 21.

Superimposed above the fixed blade 65 and pivotally mounted thereto is a movable blade 70 having forwardly directed and forwardly tapering teeth 69a, 69b, and 69c. Said movable blade is disposed in a plane parallel with the planes of the base 25 and the large driven gear 55, the pivotal mounting comprising a pivot pin 71 having an enlarged head 72 and a shank 73 which projects upwardly through a suitable opening 74 in the fixed blade 65. From the fixed blade 65, the shank 73 projects upwardly, in turn, through a first tapered washer 75, an opening 76 in the upper blade 70, a second tapered washer 77, a flat washer 78, and a split retainer ring 79. The retainer ring 79 engages a suitable circumferential groove 80 in the shank 73 whereby the upper blade is retained in pivotal engagement with the lower blade. The washers 75 and 77 are preferably made of a suitable plastic such as nylon and are tapered transversely of their axis in such manner as to accommodate to the convergent relationship between the fixed blade 65 and the movable blade 70 and provide a flat upper surface for the split retainer ring 79 to engage. The flat washer 78 may be made of metal or other suitable hard material and is preferably recessed within the upper surfaces of the uppermost tapered washer 77. Said washer 77 is preferably keyed to the upper movable blade 70 to move therewith by any suitable means such as integrally formed studs 82 disposed in suitable aligned openings 81 in the blade 70 as shown in dotted lines in FIG. 8.

Referring again to FIg. 8, the movable blade 70 extends rearwardly of the pivot pin 71 a substantial distance beneath the large drive gear 55. The rear portion of said movable blade is provided with a longitudinal slot 83 opening at the rear edge of said movable blade and extending forwardly substantially beyond the pivot pin 56. The slot 83 is provided with wear surface means in the form of an insert 84 made of nylon or other suitable wearing plastic material. The insert 84 is integrally formed and comprises a U-shaped wall 85 which provides wear surface means extending along the edges of the slot 83. Said wall 85 extends across the inner end of the slot 83 and is provided with lateral wall extensions 86 embracing the rear end edges of the movable blade 70. At the innermost end of the slot 83, the wall 85 is provided with a forwardly projecting lip 87 which overlaps the upper surface of the movable blade 70 and prevents downward displacement of the insert member with respect to said movable blade. The lowermost edge portions of the wall 85 are provided with laterally outwardly projecting flanges 88 which project beneath portions of the movable blade 70 to prevent upward displacement of said insert. Adjacent to the rearward edge of the movable blade 70, the lateral flanges 88 include enlarged portions 89 which extend under substantial portions of the movable blade and are provided with upwardly directed, integral studs 90 adapted to snugly interfit a part of apertures 91 adjacent to the rear edge of said movable blade. As shown particularly in FIGS. 3, 7, and 12, the rear edge portions of the insert 84 are provided with downwardly directed, integral projections 92 on either side of the slots 83, said projections contacting the upper surface of the lower fixed blade 65 and supporting the rear end portion of the movable blade 70. Thus, as the movable blade operates, the projections 92, suitably lubricated, move back and forth across the upper surface of the fixed blade 65.

As best seen in FIG. 14, the enlarged portion 60 of the drive pin 59 projects into the elongated opening defined by the wall 85 of the insert 84, the space afforded by the insert being only slightly more than the distance between the flats 61 whereby said drive pin can slide back and forth within the insert as it is rotated in an eccentric path by the large driven gear 55. As the driven gear rotates and the drive pin slides back and forth in the insert 84, it will be readily understood that the movable blade 70 is operated laterally about the pivot pin 71 to afford a rapid cutting action between the fixed teeth 68a, 68b, 68c, and 68d, and movable teeth 69a, 69b, and 69c.

The fore-and-aft tilt or angle between the fixed blade 65 and the movable blade 70 is such that the teeth 69a, 69b, and 69c of said upper blade project at least partly into the plane of the fixed blade 65 when said teeth of said upper blade are disposed between the pairs of teeth 68a–68b, 68b–68c, and 68c–68d, respectively, of said lower blade. Because of this angle between the blades, a slight blade interference relationship is created and each cutting surface of each upper movable tooth 69a, 69b, and 69c contacts a cutting surface of a tooth of the lower fixed blade only at a cutting edge thereof, there being no flatwise contact between the blades due to the aforementioned angle. Thus, friction between the blades exists only at this cutting edge thereby substantially reducing the inherent or nonworking load on the motor 44. This angular, cutting edge engagement combined with the uniform relative stiffness of the blades ensures a positive cutting action between the blades thus effecting more efficient cutting of tough grasses, weeds and the like. The angular relationship between the fixed and moving blades is also effective in preventing wear on the flat surfaces of said blades since these flat surfaces do not make contact. The inherent slight resilience of the blade material affords sufficient flexibility whereby the movable blade 70 can move from the position shown in FIG. 8 with the teeth 69a to 69c disposed between the fixed teeth to the position shown in FIG. 11 wherein said teeth 69a to 69c are in overlapping relationship with teeth 68a–68c, respectively. It will be readily understood that when the movable blade 70 oscillates in the opposite direction, the cutting action is identical in said opposite direction with the movable teeth 69a to 69c overlapping the fixed teeth 68b to 68d, respectively.

By referring to the intermediate position of FIG. 10, it will be noted that the teeth of the blades do not all begin and end their cutting at exactly the same time. For example, it will be noted that the movable tooth 69c has cut higher on the fixed tooth 68c than the movable tooth 69b has with respect to the fixed tooth 68b and that the cutting stroke of the movable tooth 69a with respect to the fixed tooth 68a is relatively behind, timewise, either of the other two movable teeth. This point is graphically illustrated in FIG. 10 by the broken position line A which shows the cutting position of the movable blade 69c, the position line B which shows the cutting position of the tooth 69b, and the position line C which shows the cutting position of the movable tooth 69a. Thus, the cutting action of each movable blade begins to cut at a different point of time in the overall cycle whereby the initial load of the power means 22 at each reversal of the movable blade is reduced. It will be understood that exactly this same thing occurs in reverse when the movable blade 70 moves in the opposite direction from that shown in FIG. 10; the movable tooth 69a first begins its cutting action with the fixed tooth 68b, the tooth 69b next begins its cutting action with the tooth 68c, and the tooth 69c subsequently begins its cutting action with the tooth 68d.

It will be understood that many changes in the details of the invention may be made without, however, departing from the spirit thereof or the scope of the appended claims.

I claim:

1. A shearing device comprising a housing; a motor mounted within said housing; a fixed blade made of flat, heavy gage sheet metal of substantial stiffness and limited flexibility securely mounted with respect to said housing, said fixed blade having a plurality of laterally spaced, forwardly directed teeth; a movable blade made of flat, heavy gage sheet metal of substantially the same stiffness and limited flexibility as said fixed blade, said movable blade having a plurality of laterally spaced, forwardly directed teeth; pivot means mounting said blades to each other for laterally oscillating shearing movements; transmission means connecting said motor to said movable blade whereby said motor causes lateral oscillation of said movable blade and teeth with respect to said fixed blade and teeth in rapid shearing movements; said means mounting said blades to each other including means disposing said blades with the flat planes thereof tilted at a set angle convergently in the forward direction whereby the medial and rear portions of said blades are spaced apart and the teeth of each blade tend to project at least partially into the plane of the teeth of the other blade whereby only the cutting edges of said teeth engage during relative shearing movements thereof; the stiffness of said blades ensuring a positive cutting action; said movable blade having an elongated slot therein rearwardly of said pivot means; said transmission means including an eccentric drive pin slidably disposed within said slot for oscillating said movable blade; an insert member engaging said slot and providing wear surfaces at the edges of said slot; said insert member including integrally formed downwardly directed projection means adjacent to the rear of said movable blade in sliding contact with a flat surface portion of said fixed blade whereby said movable blade is supported at its upwardly spaced rear end portion.

2. A shearing device comprising a housing; a motor mounted within said housing; a fixed blade of flat, sheet metal securely mounted with respect to said housing, said fixed blade having a plurality of laterally spaced, forwardly tapering teeth; a movable blade of flat sheet metal pivotally connected to said fixed blade for laterally oscillating shearing movements, said movable blade having a plurality of laterally spaced, forwardly tapering teeth; transmission means connecting said motor to said movable blade whereby said motor causes lateral oscillation of said movable blade and teeth with respect to said fixed blade and teeth in rapid shearing movements; means mounting said blades to each other with the planes thereof tilted convergently in the forward direction, the teeth of each blade tending to project at least partially into the plane of the teeth of the other blade, whereby only the cutting edges of said teeth engage during relative shearing movements thereof; said means mounting said blades to each other comprising a pivot pin extending through both of said blades; a washer disposed on said pin between said blades and spacing said blades apart; said washer being tapered in the forward direction whereby said movable blade is tilted convergently in the forward direction relative to said fixed blade.

3. A shearing device as set forth in claim 2: said pin disposed perpendicular to one of said blades and having an enlarged head disposed flatwise against said one blade; said pin projecting through and beyond the other said blade at a slight angle relative thereto; a second washer disposed over the outwardly projecting portion of said pin, said second washer being tapered in the rearward direction whereby the exposed surface of said second washer is perpendicular to said pin; and retainer means engaging the upper end of said pin.

4. A shearing device as set forth in claim 3: said blades being formed from substantially heavy gage metal of limited flexibility whereby to ensure a positive cutting action during said shearing movements.

5. A shearing device as set forth in claim 2: said blades being tilted with respect to each other at an angle of not more than three degrees.

6. A shearing device comprising a housing; a motor mounted within said housing; a fixed blade made of flat, heavy gage sheet metal of substantial stiffness and limited flexibility securely mounted with respect to said housing, said fixed blade having a plurality of laterally spaced, forwardly directed teeth; a movable blade made of flat, heavy gage sheet metal of substantially the same stiffness and limited flexibility as said fixed blade, said movable blade having a plurality of laterally spaced, forwardly directed teeth; means mounting said blades to each other for laterally oscillating shearing movements; transmission means connecting said motor to said movable blade whereby said motor causes lateral oscillation of said movable blade and teeth with respect to said fixed blade and teeth in rapid shearing movements; said means mounting said blades to each other including means disposing said blades with the flat planes thereof tilted at a set angle convergently in the forward direction whereby the medial and rear portions of said blades are spaced apart and the teeth of each blade tend to project at least partially into the plane of the teeth of the other blade whereby only the cutting edges of said teeth engage during relative shearing movements thereof, the stiffness of said blades ensuring a positive cutting action; said means mounting said blades to each other comprising a pivot pin extending through both of said blades; said pin disposed perpendicular to one of said blades and having an enlarged head disposed flatwise against said one blade; said pin projecting through and beyond the other said blade at a slight angle relative thereto; a washer disposed over the outwardly projecting portion of said pin, said washer being tapered in the rearward direction whereby the exposed surface of said washer is perpendicular to said pin; and retainer means engaging the upper end of said pin.

7. A shearing device as set forth in claim 6: said one blade comprising said fixed blade; said other blade comprising said movable blade and being disposed above said fixed blade, said tapered washer being disposed on top of said movable blade.

* * * * *